UNITED STATES PATENT OFFICE.

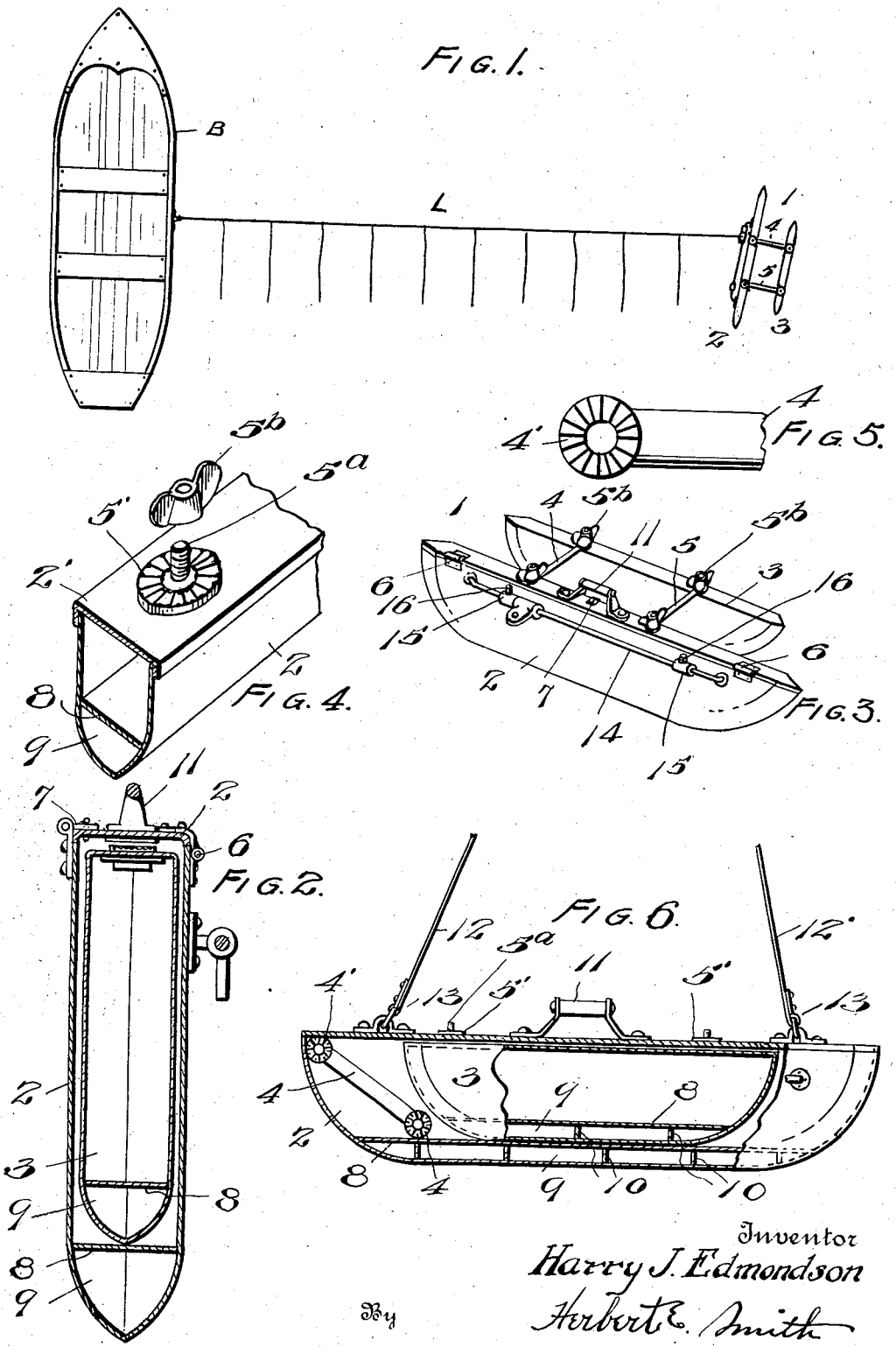

HARRY J. EDMONDSON, OF SPOKANE, WASHINGTON.

FISHING APPARATUS.

1,307,623.  Specification of Letters Patent.  Patented June 24, 1919.

Application filed September 30, 1918. Serial No. 256,260.

*To all whom it may concern:*

Be it known that I, HARRY J. EDMONDSON, a citizen of the United States, residing at Spokane, in the county of Spokane and State of Washington, have invented certain new and useful Improvements in Fishing Apparatus, of which the following is a specification.

The present invention relates to improvements in fishing apparatus, designed especially for use as an outrider or out rigger in conjunction with a boat for stretching a line between the rigger and the boat which line may be used for drag purposes and for mine sweeping but is intended specifically for use in connection with numerous fish lines.

The primary object of the invention is the provision of a buoyant support for the main line of the fishing apparatus that will be properly guided as the boat is moved forward, and held to its course to maintain the main line stretched with the desired tautness, and the invention consists in certain novel combinations and arrangements of parts as will be hereinafter more particularly pointed out.

In the accompanying drawings one complete example of the physical embodiment of the invention is illustrated according to the best mode so far devised for the practical application of the principles of the invention.

Figure 1 is a plan view of a boat showing the relation of the fishing apparatus thereto.

Fig. 2 is an enlarged, transverse sectional view of the two buoyant supports or miniature pontoons, nested one within the other for convenient transportation.

Fig. 3 is a perspective view of the two supports, in operative position.

Fig. 4 is a sectional view partly in perspective showing one of the attachment members between the supports.

Fig. 5 is a detail of one of the connecting links between the supports.

Fig. 6 is a view in side elevation, partly broken away to show the longitudinal construction of the two supports.

As previously intimated, the apparatus is adapted for numerous uses, but herein, the apparatus will be referred to as a fishing apparatus, and in order to explain the preferred form of the invention as illustrated in the drawings, a row boat B is shown having the main line L attached thereto, and the free end of the line is attached to the buoyant support indicated as a whole by the numeral 1. The main line may have attached thereto the usual fish lines for customary purposes, and by means of power applied to the boat, the boat is propelled and the main line L which is suspended between the boat and the support is carried forward, the support, by its construction and operation, holding the line L taut as shown, as the boat proceeds.

The support 1 comprises essentially two buoyant supports or metallic vessels 2 and 3 formed of proper shape, and of varying size to move readily through the water, and the two vessels are held in rigid relationship by means of the two parallel links 4 and 5, and the lid or cover 2' of the larger vessel may telescope over the vessel as in Fig. 4 or is hinged to the vessel at 6 (Fig. 2) and provided with a locking catch 7 as usual. The two vessels are adapted to be nested as shown in Figs. 2 and 6, the smaller vessel 3 being adapted to fit in the larger one 2, and the two links 4 and 5 may also be stored in the larger vessel, for transportation, rendering the vessels convenient and portable when not in use.

The vessels it will be observed are designed to move through the water, on a line parallel with the boat, but their position with relation to the boat itself is angular, thus tending to pull away from the boat as the latter is propelled, and to hold the vessels on an even keel a false bottom or horizontal partition 8 is fitted near the bottom of each to form a water tight compartment 9, and to prevent the water washing to the front and rear, vertical partitions 10 are provided, which of course do not interfere to prevent total movement of the water in the compartment, but only to retard the movement of the water, it being understood that these partitions 10 are fashioned with openings through which the water may pass slowly.

For convenience in carrying the vessels when they are nested, a handle 11 is used, and in Fig. 6 the shoulder straps 12 and 1' that are connected at 13 to the larger vessel are used as auxiliary supports.

By means of the two links 4 and 5 the vessels may be held in adjusted position with relation to each other, in order to compensate for differences in the water currents through which the vessels are passing, which sometimes require the smaller vessel to be advanced from its normal position with relation to the larger one, and at other times to be retarded, and to accomplish this result, the links are provided with perforated and serrated heads or disks 4' at their ends, which perforated heads fit over the threaded studs or bolts 5ª, arranged in pairs on the two vessels, and at the base of each of these bolts is a complementary, toothed disk 5' for the serrated heads 4'. The whole is rigidly held by means of the four butterfly or thumb nuts 5ᵇ, and it will readily be seen that the nuts may be turned loose, the links turned to parallel angular positions with relation to the vessels, and the vessels thus brought nearer together or farther apart, and then the clamp nuts 5ᵇ may be turned home to secure the parts in rigid stable position. The smaller vessel performs the function of a rudder and stabilizer for guiding the larger vessel and holding it in vertical position, and for this purpose it has been found best to make it shorter than the vessel 2, but it will readily be understood that the smaller vessel may be advanced or moved to the rear with relation to the larger vessel to adapt the support for different currents of water.

The support or outrider is designed to travel in a line parallel with the boat, but as before stated, in order to hold the line L taut, the outrider is pulled forward while at an angle to the longitudinal axis of the boat, and for this purpose and for maintaining the outrider in this position a special construction is utilized comprising the longitudinally extending rod or rail 14 near the top of the larger vessel, at one side, and extending substantially the length of the vessel to which it is secured.

Adjustably secured on the side bar 14 are a pair of collars 15, each having a set screw or bolt 16 by which the collar may be fixed at a desired point on the bar, and between these two collars the slidable sleeve 17 is carried on the bar and provided with an eyelet 18 to which the line L is attached. It will readily be apparent that the distance of the two collars from each other may be changed to restrict or increase the permitted movement of the slide sleeve, and to adapt the support for differing conditions due to varying winds, water currents etc., and of course the device is readily reversible by sliding the slide sleeve from one end to the other of the limited movement part of the rod.

As thus described and illustrated it will be seen that the device is readily portable and may be transported or carried by the fisherman when required, and when in operative relationship to the boat, the apparatus has been found to be effective and satisfactory in use.

Claims:—

1. An outrigger comprising a pair of buoyant vessels with connecting means therebetween capable of adjustment for changing the relationship of the vessels, for the purpose described.

2. An outrigger comprising a pair of buoyant vessels of different sizes, arranged in parallelism and connecting means therebetween for holding the vessels in adjusted positions, and means for holding the outrigger in a position angular to a boat to travel a course parallel with said boat.

3. The combination with a buoyant support having a side rod, a slide sleeve thereon adapted for connection with a towing or propelling boat, and adjustable collars on the rod limiting the movement of the sleeve.

4. An outrigger comprising a pair of buoyant, hollow vessels adapted to nest one within the other for packing, and in normal position arranged in parallelism, parallel connecting links between the vessels having pivotal connections therewith and means for holding the links in adjusted position.

In testimony whereof I affix my signature.

HARRY J. EDMONDSON.